July 18, 1961  A. W. MUSGRAVE ET AL  2,992,694
TIME DELAYED DIRECTIONAL SEISMOGRAPH
Filed Jan. 17, 1955
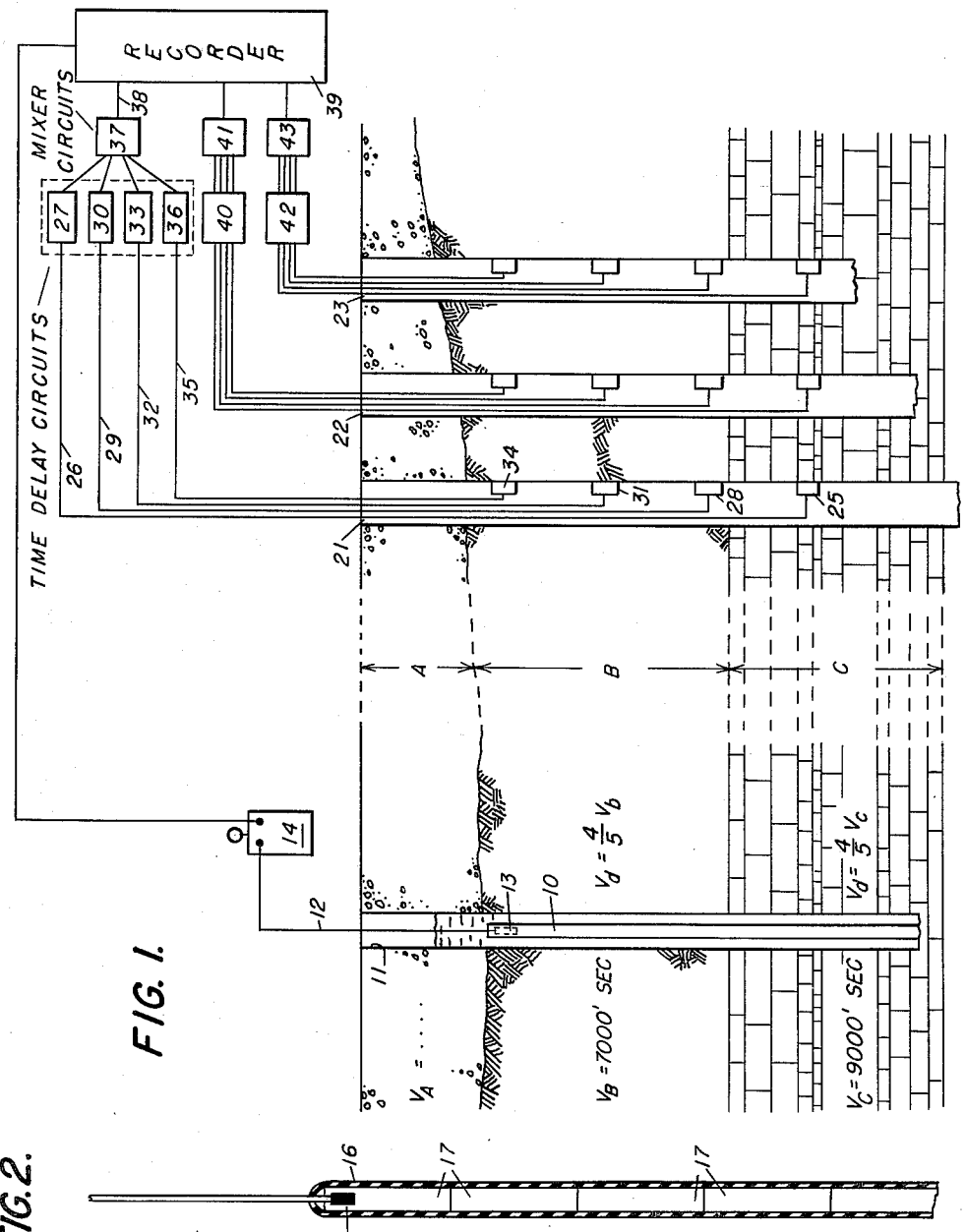
FIG. 1.
FIG. 2. FIG. 3.
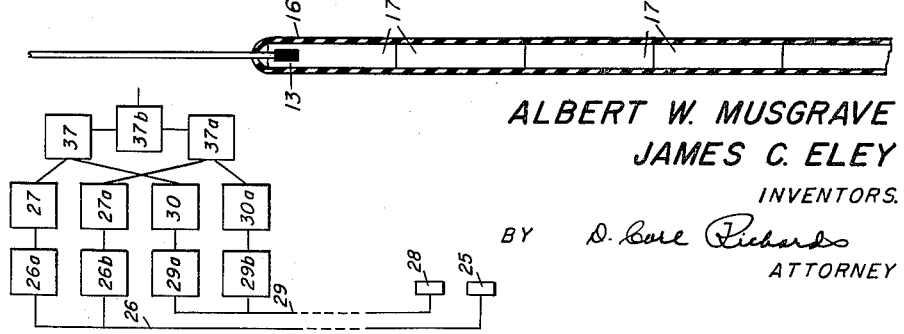
ALBERT W. MUSGRAVE
JAMES C. ELEY
INVENTORS.
BY D. Carl Richards
ATTORNEY

2,992,694
TIME DELAYED DIRECTIONAL SEISMOGRAPH

Albert W. Musgrave, Dallas, and James C. Eley, Irving, Tex., assignors, by mesne assignments, to Socony Mobil Oil Company, Inc., a corporation of New York
Filed Jan. 17, 1955, Ser. No. 482,196
8 Claims. (Cl. 181—.5)

This invention relates to seismic exploration and more particularly to producing seismic functions which are directional insense with reference to vertical travel paths.

Of the geophysical techniques, reflection seismograph commands the greatest attention in petroleum exploration. Elastic waves thus employed are generated by detonating an explosive charge at or near the earth's surface and recording on a time scale the arrival of reflections of the elastic waves from successively deeper earth horizons. The source usually comprises a charge of dynamite placed in a relatively shallow borehole. Upon detonation, elastic waves are produced which travel in all directions from the shot. The earth motion in the vicinity of the explosion may be termed a "seismic input function." A plurality of geophones on or at the earth's surface at known stations with reference to the location of the explosive charge produce electrical signals corresponding to the motion of the earth at their respective stations. The electrical signals comprise the "seismic output functions."

In many areas the response of the earth is such that energy reflected from subsurface horizons and forming at least a part of seismic output functions is masked by noise energy. Further, seismic records are often complicated by the presense of ghost reflections, i.e., energy reflected downwardly from the earth's surface immediately following detonation of a buried explosive charge.

In order to identify reflections a great number of detectors are often used. Also plural explosive charges detonated simultaneously at spaced apart points are used. For example, in some areas as high as 90 separate charges are simultaneously exploded to generate the seismic input function. A plurality of seismic signals conventionally recorded as photographic traces are then produced, each constituting an output function. Each output function often is a summation of the seismic signals generated by a score of detectors. In this manner the signals are statistically averaged to aid in differentiating reflected energy from noise energy.

The present invention is based upon the discovery of a method to be employed either at the input end or at the output end of the seismic system to impart a highly directional character to the seismic functions thus produced. This is accomplished by the introduction of a time delay between the components of a composite seismic function. The delay is related to the acoustic velocity of the earth formations through which the acoustic energy passes and results in a substantial increase in the directive character of the seismic function. This delay may be imposed at the input and/or the output end of the seismic system.

In one aspect of the invention there is provided a source of seismic waves which includes an elongated substantially continuous explosive charge supported along the length of a borehole together with means for initiating the detonation of the charge at the upper end thereof whereby the detonation progresses downwardly along the charge. The invention is characterized by the relationship between the velocity of detonation in the explosives and the velocity of propagation of waves in the adjacent medium, the relationship being such that the velocity of detonation is substantially less, in the order of four-fifths, than velocity of acoustic waves traveling downwardly through formations adjacent the borehole.

In another aspect of the invention a plurality of detectors at the receiving end of the system, positioned at spaced apart points along the length of a borehole, produce a plurality of electrical signals which are then delayed a time interval one with respect to another. The signal from the deeper of two detectors is delayed relative to the signal from the shallower detector a time interval substantially in excess of the time interval required for the acoustic energy to travel through the formations between the two detectors. The signal from the deeper detector is then composited or combined with the signal from the shallower detector to produce a single output function.

In a more specific aspect of the invention there is provided a method of seismic exploration in which directional sensitivity is increased by combining an earth motion function at one point along the vertical travel path with an earth motion function at another point along the travel path in a time relationship such that the first function is delayed an interval equal to the separation between the two points divided by about four-fifths the velocity of the acoustic waves through the formations intermediate the two points.

In accordance with a further aspect of the invention there is provided an exploring system which is highly directional with reference to vertically traveling seismic waves of differing frequencies.

In yet another aspect of the present invention, there is provided a method of producing a highly directional seismic function over a band of frequencies which comprises establishing at a first point along a borehole a first transient of a given form. At a second point along the borehole spaced vertically from the first point, there is established a second transient of the same form. At a third point spaced vertically from said first point, there is established a third transient of the same form. The first and second transients are combined with a time delay between the first and second transients which is substantially greater than the time required for an acoustic pulse to travel between the first and second points to produce a first output function. The first and third transients are combined with a time delay substantially greater than the time required for an acoustic pulse to travel between the first and third points and which time delay is different from the first-named time delay to produce a second output function. The first and second functions are then separately filtered to emphasize different frequencies thereof, and the filtered functions are combined.

For a further understanding of the present invention, reference may now be had to the following description taken in conjunction with the accompanying drawings in which:

FIG. 1 illustrates a seismic exploring system;

FIG. 2 illustrates an explosive charge suitable for carrying out the present invention, and FIG. 3 is a modification of the surface recording system of FIG. 1.

Referring now to FIG. 1, there is illustrated a seismic exploring system in which an elongated explosive charge 10 is positioned in a borehole 11 and is connected to the earth's surface through an electrical circuit 12 terminated in a detonating cap 13 at one end and a blasting device 14 at the other end.

The elongated explosive charge, as best shown in FIG. 2 may comprise a thin sheath 16 which is impervious to water. Cylindrical charges 17 stacked in an end-to-end array inside sheath 16 with their ends abutting are adapted to be detonated progressively from the upper end thereof when the detonating device 13 is energized.

While elongated charges have heretofore been used, it has been found that a charge of the type herein described may be utilized to achieve a substantial increase in the downwardly directed energy compared to a similar length and weight of charge of conventional design. More particularly, it has been found that if a charge is selected for a given borehole such that the velocity of detonation along the length of the charge is substantially less than the velocity of acoustic waves through the formations immediately adjacent the borehole, the resultant energy will be beamed or concentrated along the axis of the charge and away from the end at which detonation was initiated. Reflections from subsurface horizons are enhanced and in a measure the amplitude of horizontal waves which may obscure desired reflections relatively is decreased.

As illustrated in FIG. 1, the borehole 11 extends through a weathering formation A, a first consolidated layer B and a third formation C. In a preferred embodiment, the length of the charge will be selected as to be dependent upon the wavelength that an acoustic signal of frequency within the seismic range would have in the medium adjacent to the shot point. It will be preferable that the length of the charge be approximately equal one wavelength of such a signal. For example, if the velocity of formation B is 7,000' per second, and it is desired to record reflection energy centered at about 40 cycles per second, then a charge one wavelength long would be approximately 175 ft. in length. Such a charge may extend through several formations of different velocities, for example, layer B and C. It is desired to control a velocity of detonation over the entire length of the charge so that at any point along the charge the velocity of detonation is less than the velocity of acoustic waves traveling vertically through the adjacent formation preferably in ratio of about four to five. For example, if formation B has a vertical acoustic velocity of 7,000' per second and formation C has a velocity of 9,000' per second, it will be desired to select or adapt the charge 10 such that it has different velocities of detonation in the two formations. More particularly with reference to 40 cycle per second energy, the velocity of detonation of the charge in formation B should be about 5,600' per second and the velocity of detonation of charge 10 in the region of formation C should be in the order of 7,200' per second.

Explosives commercially available range in detonation velocities from about 5,000 feet per second to as high as about 20,000 feet per second. Thus the range of velocities encountered in the earth formations may be conveniently matched in the ratio above noted so that the detonation velocity of the charge is lower, to an ordered degree, than the acoustic velocity of the adjacent formation.

In practice an explosive charge suitable for the present invention is made up of relatively short lengths of explosive inserted into an elongated plastic tube or hose. Any desired velocity of detonation may be achieved by selecting a suitable combination of short cylinders of explosive of differing fixed velocities for assembly.

The advantage of utilizing such an explosive charge will be readily apparent when it is understood that 24, 36 or more shot holes may be found necessary to obtain a single seismogram. By selecting the velocity of detonation to be lower than the acoustic velocity of the adjacent formations, the same directivity or concentration of energy downward may be achieved with about one-half the length and weight of explosive as when using charges which, in accordance with the prior art teachings, have a velocity of detonation equal to or higher than that of the adjacent formations. Thus considerable savings in both drilling costs and explosive may be attributed to the use of applicant's invention.

The foregoing has been confined to the production of an earth motion function, i.e., elastic wavelets produced by detonation of the explosive charge at the input of the seismic system. In FIG. 1 there is illustrated one manner of utilizing the present invention at the output of the seismic system.

More particularly, three boreholes 21, 22 and 23 form the sites of a plurality of seismic detectors. Four detectors are shown in each of the boreholes 21–23. Detector 25 is connected by way of a channel 26 to a time delay circuit 27. Detector 25 is securely anchored along the borehole wall at a point in the formation C. A second detector 28 is connected by way of a channel 29 to a time delay circuit 30. Similarly, a detector 31 is connected by way of a channel 32 to time delay circuit 33 and a detector 34 is connected by way of a channel 35 to a time delay circuit 36. Earth motion functions, the electrical signals produced by detectors 25, 28, 31 and 34, are thus applied to the time delay circuits 27, 30, 33 and 36.

In accordance with a preferred embodiment of the present invention, time delay circuit 27 is provided with a delay equal to the spacing between detectors 25 and 34 divided by four-fifths the velocity of sound therebetween. Similarly, delay circuit 30 would have a delay equal to the spacing between detectors 28 and 34 divided by four-fifths the velocity of sound in formation B and, finally, time delay circuit 33 would have a delay equal to the spacing between detectors 31 and 34 divided by four-fifths the velocity of sound in formation B. In each case, time delay would be in terms of seconds; distance in terms of feet; and velocity, in terms of feet-per-second. Thereupon the delayed signals from circuits 27, 30, 33 and 36 are applied to a mixer 37 and the output thereof is applied by way of channel 38 to a recorder 39.

The signals from the detectors in borehole 22 are applied to a time delay system 40 which will include time delay units (not separately shown) which are the same as units 27, 30, 33 and 36. The outputs from system 40 are applied to a mixer 41 whose output in turn is applied to recorder 39. Similarly, signals from detectors in borehole 23 are applied by way of a similar time delay system 42 and mixer 43 to the recorder 39.

By imposing such delays in the production of the seismic functions, i.e., the outputs of mixers 37, 41 and 43, the effective directional character of the detector array is greatly enchanced.

It will now be appreciated that a delay in the production of seismic functions may be employed either at the input or the output end of a seismic system and that the illustrations and the above description are to be taken by way of example only and not by way of limitation. Modifications, of course, may be made from the specific systems illustrated.

The time delay units 27, 30, 33, 36, etc., may be of the type well known in the art. For example, low pass filters of the character used in seismic exploration may be designed in accordance with the foregoing specifications by those skilled in the art to impose the desired delay. Such procedure of course would eliminate the high frequency components from the composite seismic function. Alternatively, the time delay circuits 27, 30, 33 and 36 may comprise magnetic delay lines of the type illustrated and described in Patent No. 2,628,689 to Rieber.

The directional character achieved as above described is optimum for the frequencies at which the spacing between detectors 25, 28, 31 and 34 has the desired relationship with respect to the time delay circuits 27, 30, 33 and 36. In order to produce a seismogram of more character, a system may be employed that is of optimum design for a band of frequencies rather than single frequency. Such a system as schematically illustrated in FIG. 3 may be employed. FIG. 3 corresponds generally to the portion of FIG. 1 comprised of detectors 25 and 28 and time delay circuits 27 and 30. A pair of filters 26a and 26b having different cut-off frequencies are connected in parallel in channel 26. Similarly, filters 29a and 29b have been provided in channel 29. Filters 26a and 29a have the same frequency characteristic and filters 26b and 29b are identical to each other. However, the filters 26a and 29a selectively emphasize one frequency component of the signals on channels 26 and 29, whereas filters 26b and 29b will emphasize a different frequency component of the signals on channels 26 and 29. The output of filter 26a is applied to time delay network 27. The output of filter 26b is applied to time network 27a. Similarly, filter 29a is connected to time delay network 30 and filter 29b is connected to time delay network 30a. Delay networks 27 and 30 are connected as in FIG. 1 to mixer circuit 37. Delay networks 37a and 30a are connected to a mixer circuit 37a. Mixer circuits 37 and 37a are then connected to an output mixer 37b which thereupon exhibits at its output a seismic transient highly directional for at least two frequency components of the signals from geophones 25 and 28. Additional filters may be provided along with their delay networks to include more frequency components of directional character in a given band.

It will now be apparent that directional character may also be imparted over a given band of frequencies by the use of selected configurations at the shot location. More particularly, a plurality of shot holes may be employed in which there are provided elongated or distributed explosive charges and wherein the several charges have different lengths and different velocities of detonation to emphasize in accordance with the above description certain selected frequency components within a given seismic band.

In FIGS. 1 and 2 the explosive charge has been illustrated as comprising an elongated cylindrical structure having a continuously distributed explosive charge housed in a water proof tube. It is to be understood that point charges may be utilized consistent with the objects of the present invention and connected together by an explosive delay line so that the overall or composite velocity of detonation of the charge is substantially below the velocity of travel of acoustic waves in the surrounding medium. For example, an explosive material such as Primacord may be utilized to interconnect spaced point dynamite charges. The Primacord may be coiled or spiraled intermediate adjacent charges such that a time interval greater than required for the travel of acoustic waves through the formations separating two adjacent point charges will be utilized for detonating the Primacord between such charges.. By this means, a first transient will be produced by an upper charge. At a time representative of travel of said first transient past the location of a lower charge, a second transient is produced by such lower charge with a time delay relative to the appearance of the first transient at the location of the lower charge of about one-fourth the time of travel of said first transient between the two charge locations thereby to produce a single downwardly traveling transient.

Having described the invention in connection with the foregoing modifications, it is to be understood that further modifications may now suggest themselves to those skilled in the art, and it is intended to cover such modifications as fall within the scope of the appended claims.

What is claimed is:

1. In seismic exploration the method of producing a highly directional seismic function which comprises generating at a first point along a bore hole an electrical transient corresponding in form to earth movement at said point, generating at a second point along said bore hole spaced vertically above the first point a second electrical transient of the same form, and compositing said transients with a time delay between said two transients which is substantially greater than the time required for an acoustic pulse to travel through the earth formations separating said first and second point thereby to form a single function.

2. In seismic exploration the method of producing a highly directional seismic function over a band of frequencies which comprises establishing at a first point along a bore hole a first transient of a given form, establishing at a second point along said bore hole spaced vertically from the first point a second transient of the same form, at a third point spaced vertically from said first point establishing a third transient of said same form, combining said first and said second transients with a time delay between said first and second transients which is substantially greater than the time required for an acoustic pulse to travel between said first and second points to produce a first output function, combining said first and third transients with a time delay substantially greater than the time required for an acoustic pulse to travel between said first and third points and which time delay is different from the first named time delay to produce a second output function, separately filtering said first and second functions to emphasize different frequencies thereof and combining the filtered functions.

3. Apparatus for seismic exploration comprising at least two sources of seismic disturbances vertically arranged below the surface of the earth, actuating means including timing means operatively connected to said sources to produce actuations thereof, the time between said actuations being in the nature of 1.2 times the travel time of a seismic disturbance between said sources, and laterally spaced receivers for receiving and recording said seismic disturbances.

4. Apparatus for seismic exploration comprising at least two sources of seismic disturbances spaced from one another vertically arranged below the surface of the earth, actuating means including timing means operatively connected to said sources to produce actuations thereof, said timing means including an elongated explosive member for actuating the lower of said charges later than actuation of the upper of said charges, the time between said actuations being in the nature of 1.2 times the travel time of a seismic disturbance between said sources, and laterally spaced receivers for receiving and recording said seismic disturbances.

5. Apparatus for seismic exploration comprising at least two sources of seismic disturbances, vertically arranged below the surface of the earth, actuating means including timing means operatively connected to said sources to produce actuations thereof, said actuating means including an explosive detonator for one of said sources, the time between said actuations being in the nature thereof 1.2 times the travel time of a seismic disturbance between said sources, and laterally spaced receivers for receiving and recording said seismic disturbances.

6. Apparatus for seismic exploration comprising at least two sources of seismic disturbances consisting of spaced part constituents of an elongated explosive arranged vertically below the surface of the earth, actuating means including timing means operatively connected to said sources, said actuating means including a detonator for initiating a detonating of the upper end of said explosive successively to detonate said two sources, said timing means consisting of the explosive between said sources for producing timed actuations of said sources, the time between actuations thereof being in the nature of 1.2 times the travel time of a seismic disturbance between said sources, and laterally spaced receivers for receiving and recording said seismic disturbances.

7. Apparatus for seismic exploration comprising at least two sources of seismic disturbances comprising spaced apart constituents of elongated explosive arranged vertically below the surface of the earth, actuating means and timing means operatively connected to said sources, said actuating means including an explosive detonator positioned at the upper end of said elongated explosive for initiating detonation at the upper end of said explosive, said timing means including the explosive between said sources for time-spaced actuation of both said sources, the time between actuation thereof being in the nature of 1.2 times the travel time of a seismic disturbance between said sources, and laterally spaced receivers for receiving and recording said seismic disturbances.

8. Apparatus for seismic exploration comprising at least two sources of seismic disturbances vertically arranged below the surface of the earth, actuating means including timing means operatively connected to said sources, the time between said actuations being in the nature of 1.2 times the travel time of the seismic disturbance between said sources, and at least two laterally spaced and vertically arranged receivers for receiving and recording said seismic disturbances.

References Cited in the file of this patent

UNITED STATES PATENTS

| | | |
|---|---|---|
| 1,998,412 | Prescott | Apr. 16, 1935 |
| 2,087,702 | Peters | July 20, 1937 |
| 2,377,903 | Rieber | June 12, 1945 |
| 2,473,469 | Dahm | June 14, 1949 |
| 2,556,299 | Scott | June 12, 1951 |
| 2,569,411 | Ellis | Sept. 25, 1951 |
| 2,609,885 | Silverman | Sept. 12, 1952 |
| 2,628,689 | Rieber | Feb. 17, 1953 |
| 2,770,312 | Silverman | Nov. 13, 1956 |
| 2,779,428 | Silverman | Jan. 29, 1957 |

OTHER REFERENCES

Shock: "The Progressive Detonation of Multiple Charges in a Single Seismic Shot," Geophysics Magazine, Vol. XV, No. 2, April 1950, pages 208–218.